Figure 4:
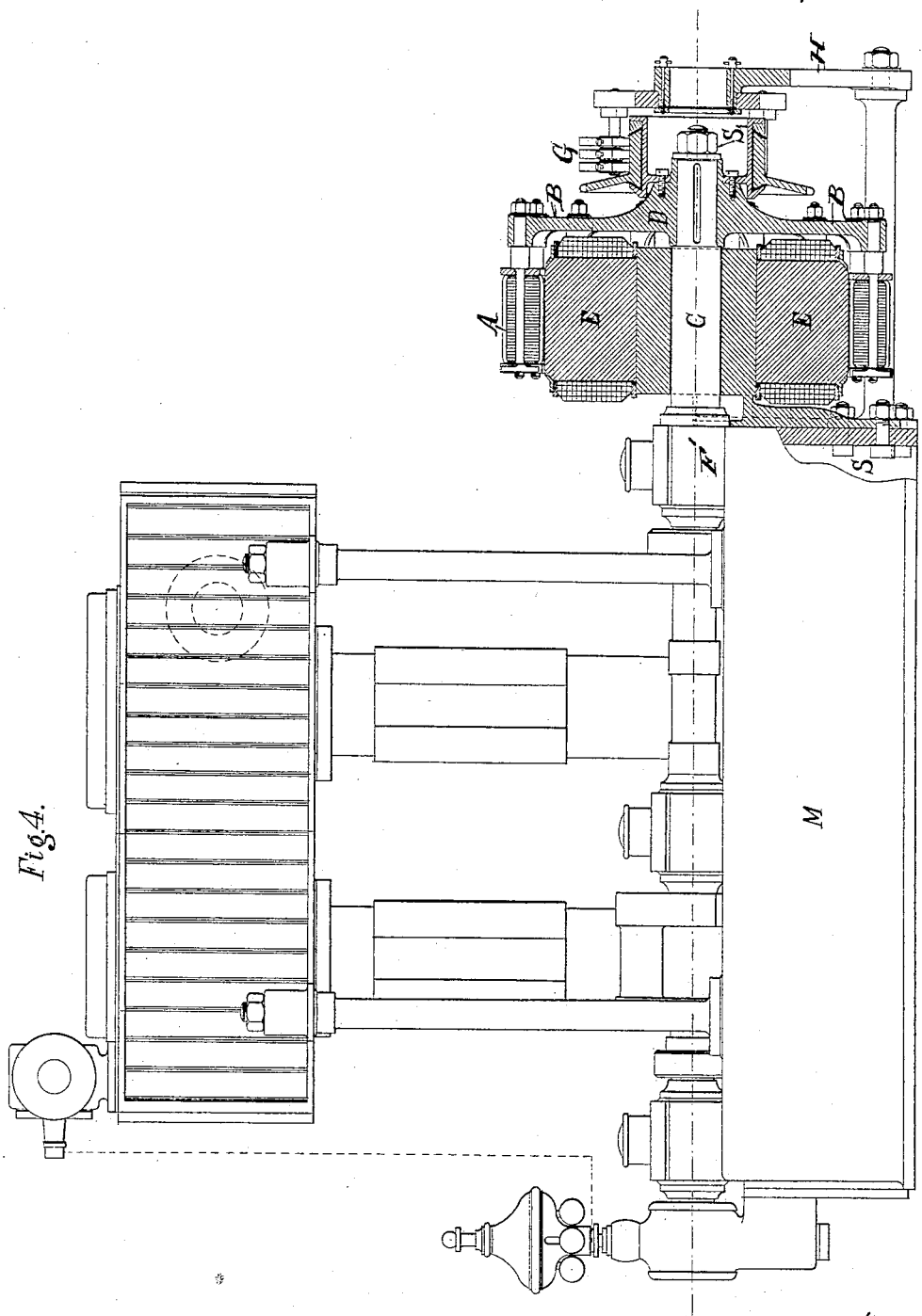

(No Model.) 2 Sheets—Sheet 1.
F. VON HEFNER-ALTENECK & C. HOFFMANN.
DYNAMO ELECTRIC MACHINERY.
No. 395,019. Patented Dec. 25, 1888.
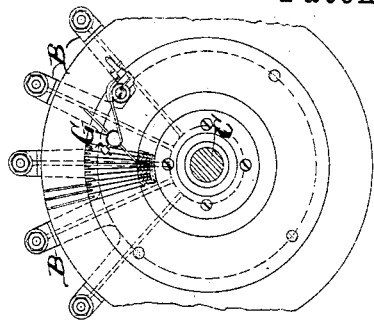
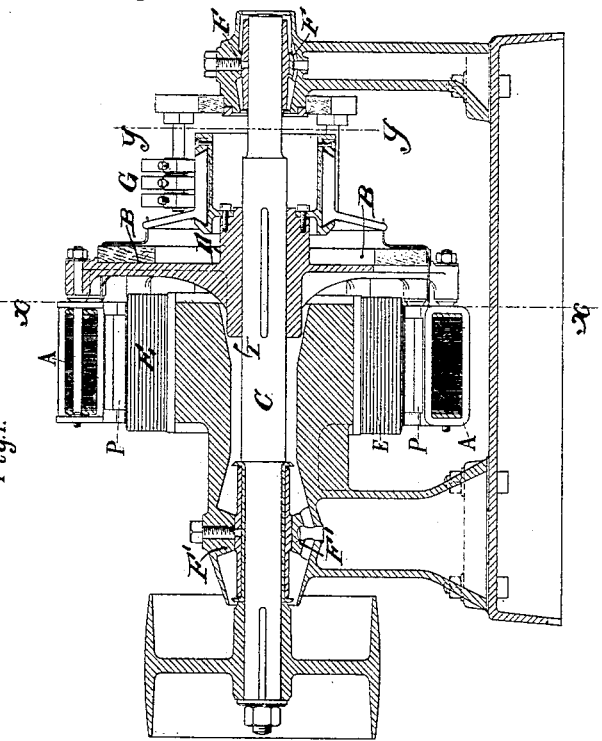
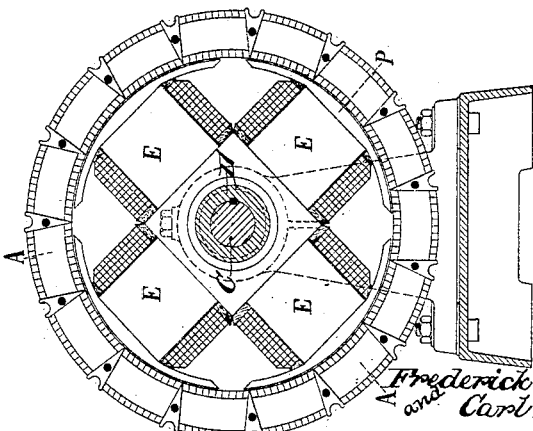
Witnesses:
Inventors.
Frederick von Hefner-Alteneck
and Carl Hoffmann
By Chas. S. Whitman,
Attorney (No Model.) 2 Sheets—Sheet 2.

F. VON HEFNER-ALTENECK & C. HOFFMANN.
DYNAMO ELECTRIC MACHINERY.

No. 395,019. Patented Dec. 25, 1888.

Witnesses:

Inventors.
Frederick von Hefner Alteneck
and Carl Hoffmann,
By Chas. S. Whitman
Attorney.

UNITED STATES PATENT OFFICE.

FRIEDRICH VON HEFNER-ALTENECK AND CARL HOFFMANN, OF BERLIN, GERMANY, ASSIGNORS TO SIEMENS & HALSKE, OF SAME PLACE.

DYNAMO-ELECTRIC MACHINERY.

SPECIFICATION forming part of Letters Patent No. 395,019, dated December 25, 1888.

Application filed May 28, 1887. Serial No. 239,674. (No model.)

*To all whom it may concern:*

Be it known that we, FRIEDRICH VON HEFNER-ALTENECK, a subject of the King of Bavaria, and CARL HOFFMANN, a subject of the King of Prussia, both residing at Berlin, in the German Empire, have invented certain new and useful Improvements in Dynamo-Electric Machines and their Combination with Motors, of which the following is a specification.

Our invention has for its object to provide a new and simplified construction in dynamo-electric machines, and in their combination with motors; and it consists in so constructing the same that the intensity of the current generated thereby is increased and the number of parts connecting the dynamo and the motor lessened.

Referring to the accompanying drawings, in which corresponding parts are designated by similar letters, Figure 1 is a vertical longitudinal section of a dynamo-electric machine constructed according to our invention. Fig. 2 is a vertical cross-section on the line $x\,x$ of Fig. 1. Fig. 3 is a vertical section on the line $y\,y$ of Fig. 1; and Fig. 4 is a side view, partly in section, of a dynamo coupled with a motor.

The circular armature A, which is of the type known as the "Pacinotti ring-armature," is connected by means of the spokes B and hub D with the shaft C, and rotates therewith, while the shaft itself is carried upon suitable bearings, F F'. Upon one bearing are mounted suitable collectors, G, for taking the generated electricity from off the rotating armature, while upon the other support are mounted two or more electro-magnets, E, the said magnets uniting at the center, through which is a perforation, I. The said magnets may or may not be provided with pole extensions or pieces P, and are so constructed that they fit into the ring-armature as snugly as possible. The shaft C extends through the perforation I, but does not touch the magnets. One end of the shaft C may be provided with a wheel, adapted to receive a belt, by which motion may be communicated to it.

Instead of thus providing the shaft with a wheel, to connect it with the motor, the shaft may be common to both the dynamo and the motor, in which case the stationary field-magnets E are fastened to the non-moving parts of the motor, which also receive a bearing for the shaft. The magnets may be fastened to the said parts of the motor either by being cast integral therewith or being fastened thereto by screws or bolts S. In this case I prefer to do away with the outer bearing or support, F, hereinbefore described, though it may still be used when it is desirable to give great solidity to the machine and shove the hub D, carrying the armature, upon the free projecting end of the shaft C, where it is secured by means of the nut S', while the collectors G are carried upon a bracket, H, projecting from and fastened to the non-moving parts of the motor.

The advantages of the construction are numerous: among others, that nearly all the magnetic lines of force issuing from the exciting-poles are cut by the wires of the rotating armature, and, hence, all the magnetism generated in the magnets may be utilized; that the pole-pieces require but very short connecting parts, so that the injurious resistance of the transmission of magnetism in these connecting parts is reduced to a minimum; that all magnetic lines of force being, so to say, captured by the ring and transformed into useful activity, this machine gives off very little so-called free magnetism—that is, such as acts outwardly and into distance, and which may exert a very injurious and dangerous action upon instruments used for measuring the generated electric current and, in case of its application on ship, also upon the position of the compass-needle; that when combined with the motor, as shown, there is a considerable saving of expense and space in consequence of the removal of one of the bearings for the shaft, as well as of a part or whole of the base-plate for the dynamo; and that, as shown in Fig. 4, the armature may be drawn off the shaft without necessitating the dismounting of a journal-box.

Having now described our invention, what we claim, and desire to secure by Letters Patent, is—

1. In a dynamo-electric machine, the combination of a revolving ring-armature mounted upon a shaft, bearings for the said shaft, stationary magnets supported thereon inclosing the said shaft and inclosed by the armature, substantially as and for the purpose described.

2. The combination of a revolving ring-armature mounted upon a shaft, a motor, and magnets fastened to the non-moving parts thereof surrounding the said shaft and inclosed by the said armature, substantially as and for the purpose described.

FRIEDRICH VON HEFNER-ALTENECK.
    CARL HOFFMANN.

Witnesses:
 B. ROI,
 F. VON VERSEN.